US008649760B2

(12) United States Patent
Salkini et al.

(10) Patent No.: US 8,649,760 B2
(45) Date of Patent: Feb. 11, 2014

(54) OVER-THE AIR PRE-PAID WIRELESS SYSTEM AND METHOD

(75) Inventors: Jay Salkini, Clarksville, MD (US); Thomas V. Joseph, III, Lothian, MD (US)

(73) Assignee: TECORE, Inc., Hanover, MD (US)

( * ) Notice: Subject to any disclaimer, the term of this patent is extended or adjusted under 35 U.S.C. 154(b) by 1391 days.

(21) Appl. No.: 12/007,565

(22) Filed: Jan. 11, 2008

(65) Prior Publication Data

US 2008/0182553 A1 Jul. 31, 2008

Related U.S. Application Data

(60) Provisional application No. 60/880,008, filed on Jan. 12, 2007.

(51) Int. Cl.
*H04M 11/00* (2006.01)

(52) U.S. Cl.
USPC ........... 455/406; 455/408; 455/405; 455/407; 455/409; 455/432.1; 455/432.3; 455/435.1

(58) Field of Classification Search
USPC .............. 455/408, 405, 406, 407, 409, 432.1, 455/462.3, 435.1
See application file for complete search history.

(56) References Cited

U.S. PATENT DOCUMENTS

| | | | |
|---|---|---|---|
| 2001/0049656 A1* | 12/2001 | Halkosaari et al. | 705/39 |
| 2002/0086671 A1* | 7/2002 | Amin et al. | 455/432 |
| 2004/0023636 A1* | 2/2004 | Gurel | 455/405 |
| 2004/0132449 A1* | 7/2004 | Kowarsch | 455/432.1 |
| 2007/0155381 A1* | 7/2007 | Alberth et al. | 455/432.1 |

* cited by examiner

*Primary Examiner* — Justin Lee

(57) ABSTRACT

An over the air (OTA) Prepaid system, and a corresponding method, allows wireless connectivity when a wireless network would typically reject a user, such as when the user's profile cannot be validated. In wireless networks, unrecognized users are denied service due to the inability of the network to collect funds from the user for the services to be provided. When such a rejection scenario occurs, the OTA Prepaid system automatically (no user interaction required) initiates the process of local account allocation.

17 Claims, 11 Drawing Sheets

OVER-THE AIR PRE-PAID WIRELESS SYSTEM AND METHOD

CROSS-REFERENCE TO RELATED APPLICATION(S)

This application claims priority from U.S. Provisional Application No. 60/880,008, filed Jan. 12, 2007 and entitled "System and Method for Pre-Paid Over the Air Wireless Calling," the content of which is incorporated herein in its entirety to the extent that it is consistent with this invention and application.

TECHNICAL FIELD

The technical field is pre-paid wireless communications.

BACKGROUND

In current GSM networks, a mobile phone user may not always be able to receive service. Examples of such service denial include when the user's home network does not have a roaming agreement with the local network where the user is located, or where the user's service otherwise is restricted.

SUMMARY

What is disclosed is an over the air (OTA) Prepaid system, and a corresponding method, that allows wireless connectivity when a wireless network would typically reject a user, such as when the user's profile cannot be validated. In wireless networks, unrecognized users are denied service due to the inability of the network to collect funds from the user for the services to be provided. When such a rejection scenario occurs, in an embodiment, the OTA Prepaid system automatically (no user interaction required) initiates the process of local account allocation.

Also disclosed is a method, implemented on a suitably programmed device, for providing over the air (OTA) prepaid calling services. The method includes the steps of receiving at a wireless system, an access request from a wireless device; determining if the wireless device has a valid profile; if a valid profile is not found, allocating local resources in wireless system to create a temporary profile associated with the wireless device; and sending information on the temporary device to the wireless device.

Further disclosed is a method, implemented on a suitably programmed device, for providing over the air (OTA) prepaid calling services. The method includes receiving at a local wireless system, a location update request from a wireless device; determining if a route exists to a HLR of a home network of the wireless device; if a route does not exist determining if the wireless device has a valid profile in an HLR of the local wireless network; if a valid profile is not found in the HLR of the local wireless network, allocating local resources in local wireless system to create a temporary profile associated with the wireless device; and sending information on the temporary device to the wireless device.

Still further, what is disclosed is system, implemented on a suitably programmed device, for providing over the air (OTA) prepaid calling services. The system includes means for receiving at a wireless system, an access request from a wireless device; means for determining if the wireless device has a valid profile; if a valid profile is not found, means for allocating local resources in wireless system to create a temporary profile associated with the wireless device; and means for sending information on the temporary device to the wireless device.

Yet further, what is disclosed is a method, implemented on a computing device, for providing over the air (OTA) prepaid communication services. The method includes the steps of receiving, at a local network, a communication from a mobile device entering the local network; determining if a valid profile corresponding to the mobile device exists, comprising determining if the local network holds the valid profile, and determining if a home network of the mobile device holds the valid profile; and if the valid profile is not found, allocating resources at the local network to create a temporary profile for the mobile device.

DESCRIPTION OF THE DRAWINGS

The detailed description will refer to the following drawings in which like numbers refer to like items, and in which.

DETAILED DESCRIPTION

Figure 1:
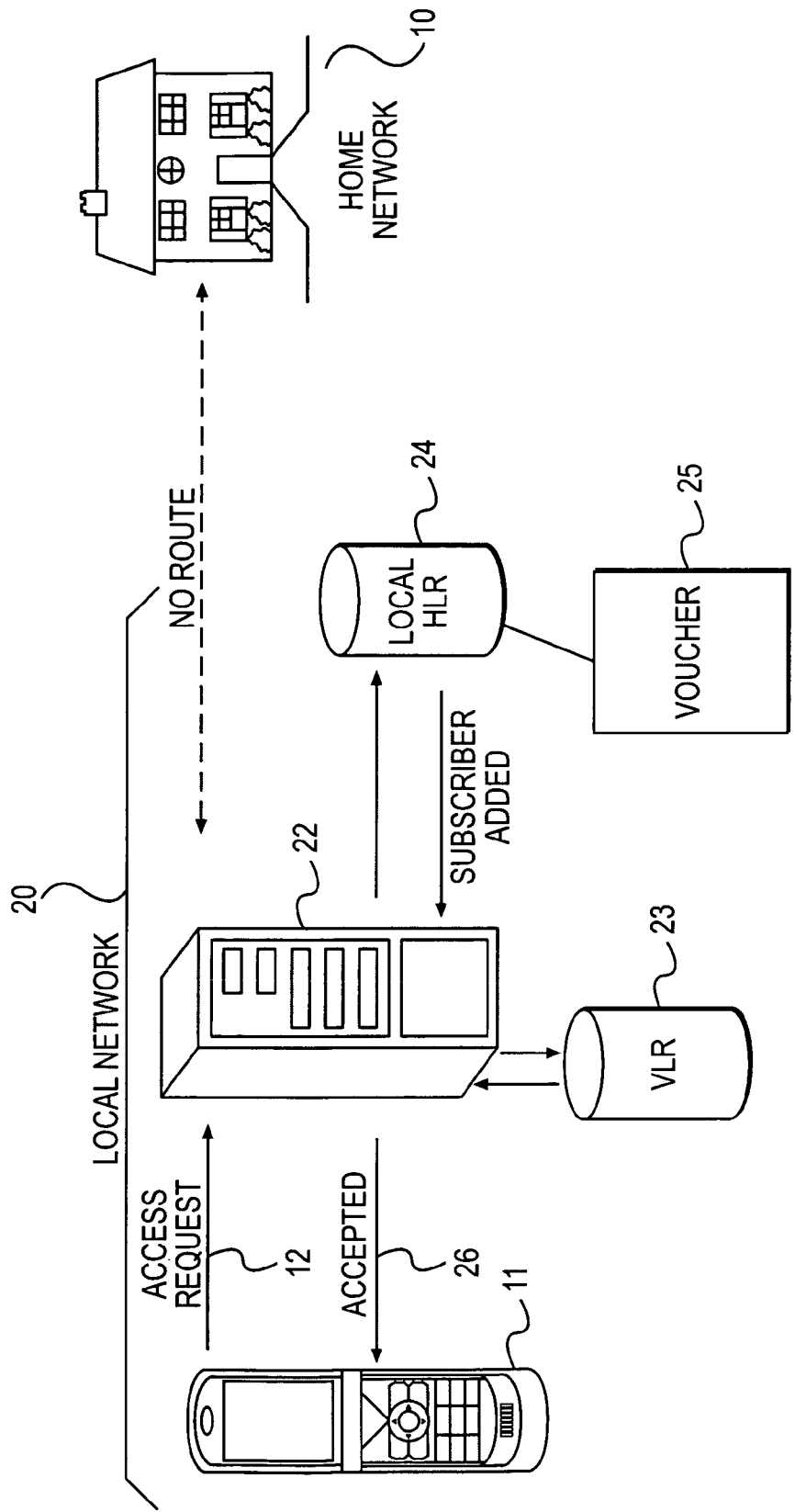
FIG. 1 illustrates an environment in which the OTA Prepaid system may operate.

An Over-The-Air (OTA) Prepaid system provides a fully integrated, real time prepaid mechanism or feature that is used to provide prepaid service from a wide range of applications. The OTA Prepaid system supports both wireless and wireline calling, including origination, termination, and short message service (SMS). This prepaid service is extended to a mobile device user who otherwise would be denied service when the user performs a location update. FIG. 1 illustrates an environment in which the OTA Prepaid system may function. A home network 10 has associated with it, a wireless device 11, which may be, for example a GSM mobile telephone. The device 11 is within the coverage area of local network 20. As shown, local network 20 includes a controller 22 and a local home location register (HLR) 24. The controller 22 also may include a visitor location register (VLR) 23.

Also as shown in FIG. 1, the local network 20 and the home network 10 do not have a roaming agreement ("no route"). To allow a user of the device 11 to receive a call (call termination) or to place a call (call origination), the herein described OTA Prepaid system allows the user of the device 11 to establish communications with the controller 22, establish an account, and then send and receive wireless calls. In an embodiment, part of the OTA Prepaid system uses voucher 25, which is validated and stored in the local network 20, and which can be updated, including adding money to the user's account. The voucher 25 is a prepaid card that can be provided in many different forms, including a cash register transaction, a prepaid card, or a printed voucher, for example. The OTA Prepaid system provides a mechanism, including IVR and USSD messaging, to transfer funds from the voucher to the user's account. The information from the voucher 25, including monetary value, card number, and associated parameters is maintained in a database that is part of, or is accessible to, the OTA Prepaid system. The OTA Prepaid process begins when the device 11 initiates a location update transaction with the controller 22. The controller 22 processes an access request 12 and if accepted, allocates the user a MSISDN, which is sent to the user by way of a follow-on SMS message 26 that welcomes the user to the local system 20. The user is added to the local HLR 24. Once the SMS message 26 has been received, the user can receive inbound calls at the device 11. The user then may purchase a voucher and apply the voucher to the user's account, at which time originating and terminating access both are enabled.

The qualifying factor in determining whether or not the OTA Prepaid system is available to a user typically will be a rejection of service from the user's home network 10 or the inability of the OTA Prepaid system to access the user's home network 10. Thus, without the service provided by the OTA Prepaid system, a user would go unserved during the time the user is in the coverage area of the local network 20. This subscriber, who would otherwise be denied service, will be allowed to access the local system 20 through the OTA Prepaid system, based on the selection of the network 20 by the device 11. The initial access request 12 invokes the procedures that allow the user to access non-chargeable features. For access to chargeable features, the user completes a top up procedure and add funds to the user's account.

Figure 2:
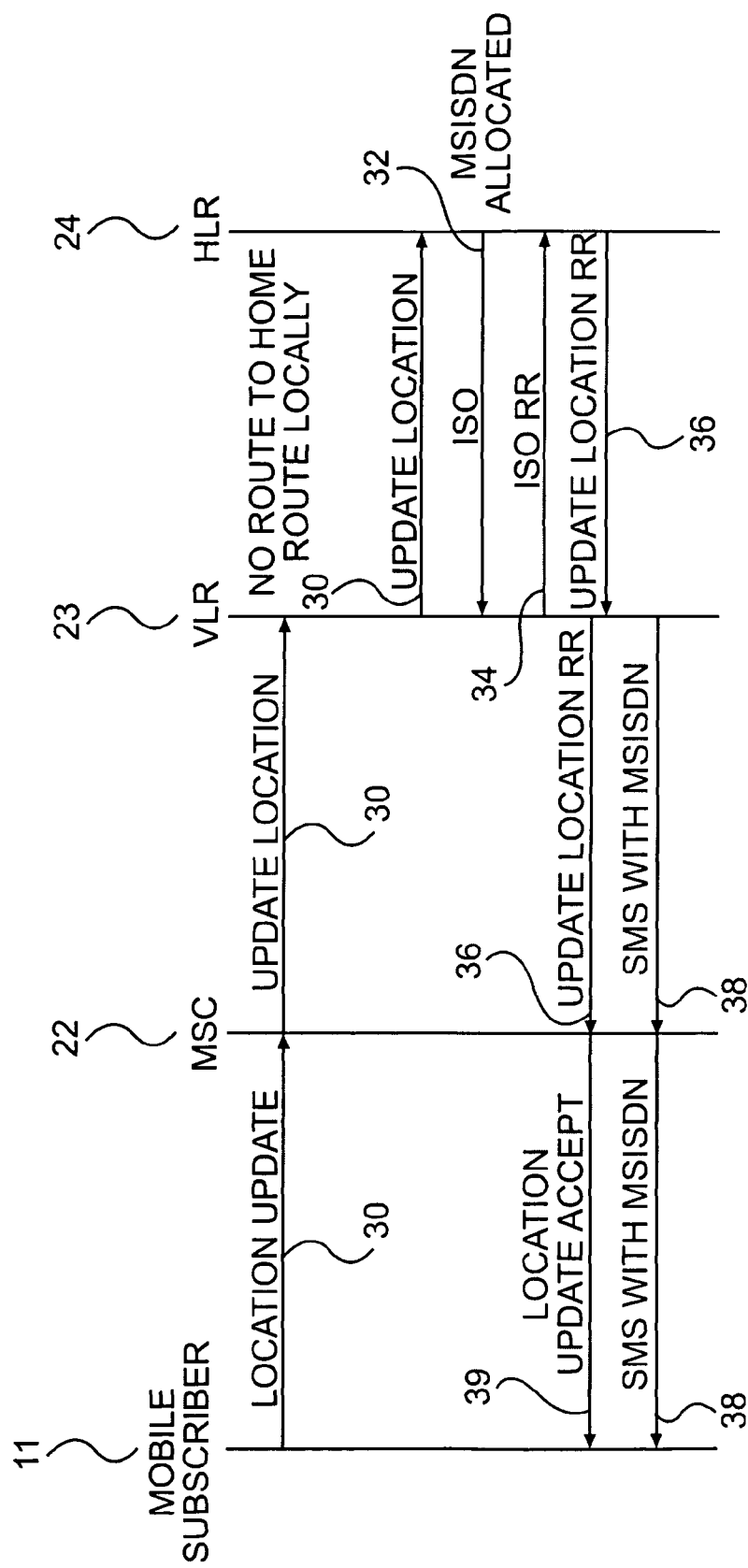
FIG. 2 illustrates a call connection process using the OTA Prepaid system.

FIG. 2 illustrates in more detail the initial access when a user is added to the local network 20 of FIG. 1 using the OTA Prepaid system. As shown in FIG. 2, the HLR of the home network 10 is not available (no roaming agreement). When "on", the device 11 attempts to update 30 its location with the controller 22. The controller 22 checks the VLR 23 and determines there in no roaming agreement for the device 11. The location update 30 then is passed to the local HLR 24. The HLR 24, under control of the controller 22, allocates to the device 11 a mobile subscriber integrated services digital network (MSISDN) number, which is used to uniquely identify the device 11 in the network 20. The location update process proceeds as shown, with the account information in an SMS 38 (short message), and ending with the device 11 accepting 39 the location update.

If the update 30 is an original location update with the HLR 24, then the device 11 is dynamically added to the HLR 24. The subscriber information with the MSISDN in the HLR 24 is temporary, and a date, which may be a default value, is set for removal of the device 22 from the local network 20. Other parameters that pertain to the user's profile, such as the customer group (routing translations), the distributor, and the rate plan also may be provided as default values, and are updated when the user adds money to the user's account. After the addition to the HLR 24 is made, the HLR 24 returns the required information to the VLR 23, based on standard profile insertion mechanisms, and the user looks, to the local network 20, as a normal OTA Prepaid subscriber. In an embodiment, the default features set for these "temporary" prepaid users do not include supplementary services other than CLIP and prepaid SMS.

In some instances, the OTA Prepaid service is denied to users of other networks. For example, if a roaming agreement is in place with the user's home network, or if the user's home network is part of a preprogrammed list, the user is treated according to normal wireless operations, meaning that if the user's mobile device is validated, the user is allowed wireless service in the local network coverage area based on the user's profile established with the user's home network 10. If the user's home network denies service, or if the user is from a prohibited network, that user is denied service in the coverage area of the local network 20.

FIGS. 3-7 illustrate embodiments of methods of operation of the OTA Prepaid system. Such methods may be implemented by software, hardware, firmware, or any combination of software, hardware, and firmware, incorporated into the controller 22 of FIG. 1. Alternatively, the methods may be implemented on a device that is external to the controller 22.

Figure 3:
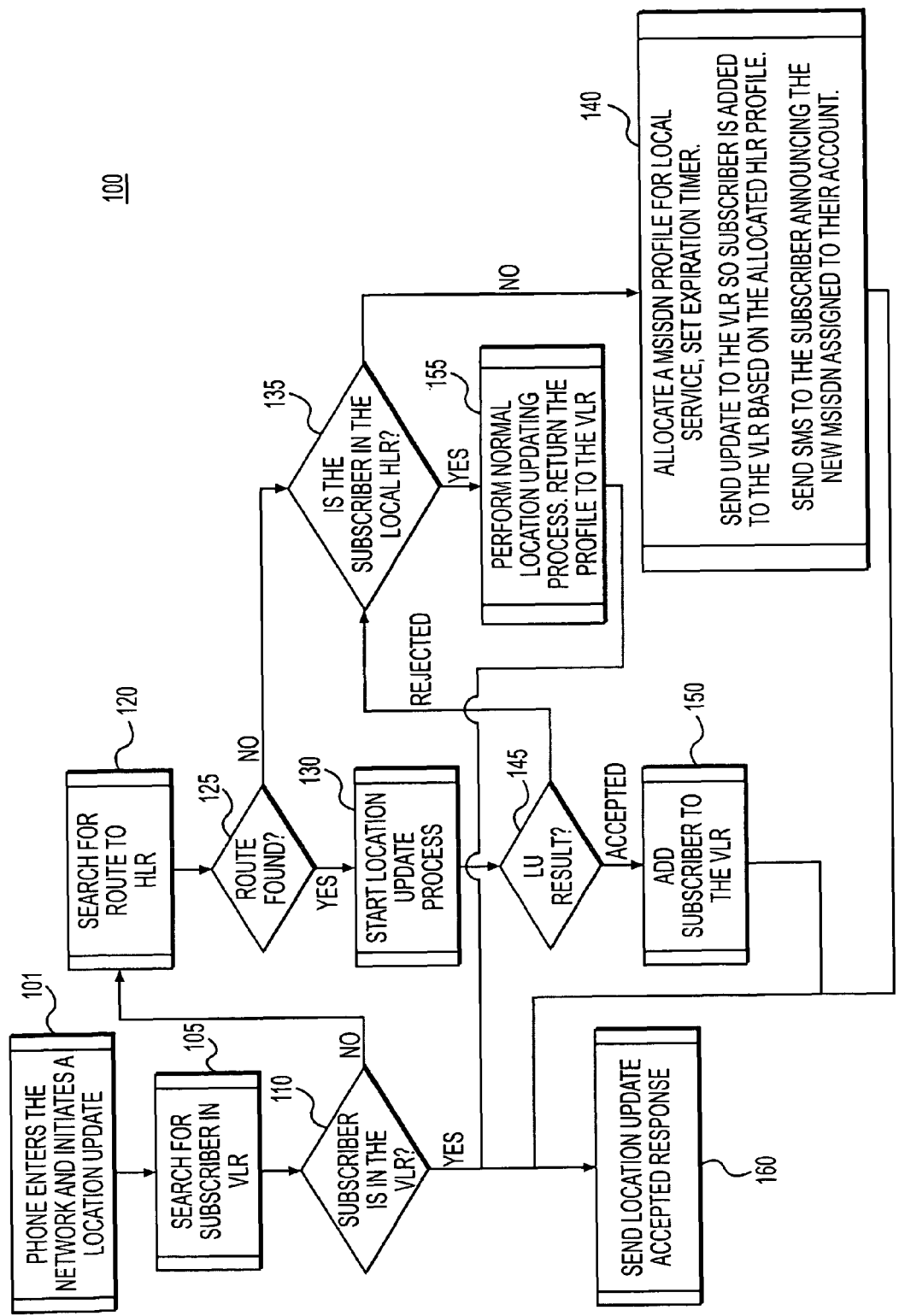
FIG. 3 is a flowchart illustrating one embodiment of an initial system access method using the OTA Prepaid system.

FIG. 3 is a flowchart illustrating one embodiment of an initial system access method 100. The access method 100 begins in block 101 when the mobile device 11 enters the coverage area of local network 20 and initiates a location update with controller 22. The controller 22 searches the VLR 23 to determine if the user of the mobile device 11 is registered. With the search completed, block 110, if the user is not in the VLR 23, the controller 22 searches, block 120, for a route to the HLR of the home network 10. If a route is not found in block 125, the controller 22 determines, block 135, if the user is in the local HLR 24. If the user in not in the local HLR 24, the controller 22 allocates (block 140) a MSISDN to the user, including a profile for local service, and sets a timer for expiration of the MSISDN. This update information then is sent to the VLR 23 so that the user appears in the VLR of the local network 20. In addition, the controller 22 sends a SMS message to the device 11 announcing the new MSISDN that has been assigned to the user's account. Following the operations enumerated above for block 140, the method 100 moves to block 160.

Returning to block 135, if the user is in the local HLR 24, the controller 22 performs an normal location update and returns the user profile to the VLR 23 (block 155). The method 100 then moves to block 160.

Returning to block 125, if a route is found, the controller 22 starts the location update process, block 130. In block 145, the location update result is either accepted or rejected by the controller 22. If the location update is rejected, the method 100 moves to block 135. If the location update is accepted, the controller 22 adds the user to the VLR 23 (block 150). Following addition of the user to the VLR 23, the method 100 moves to block 160. In block 160, the location update is sent to the device 11, along with an accepted response.

Figure 4:
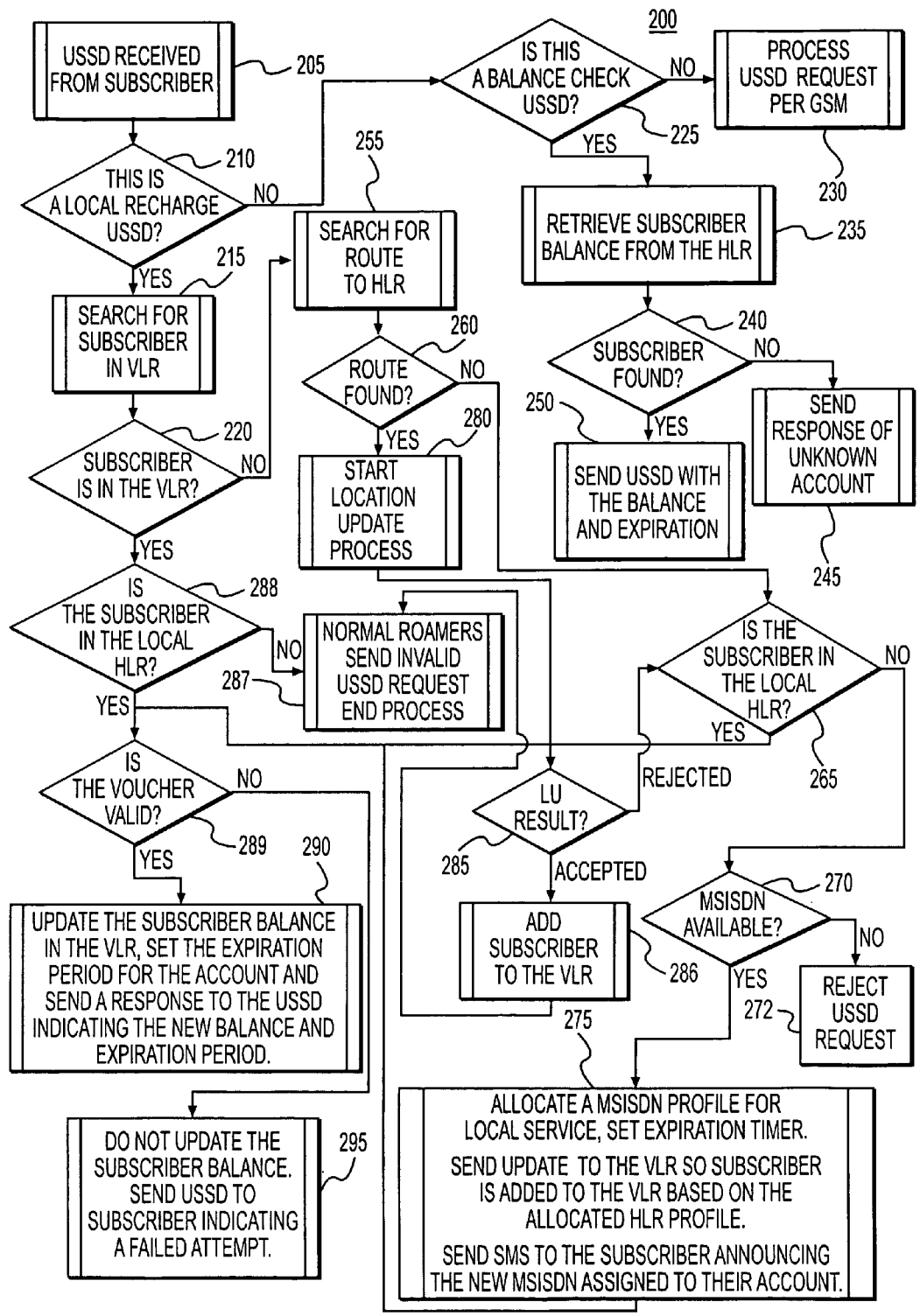
FIG. 4 illustrates an embodiment of a method for unstructured supplementary services data messaging.

When a user has an account at the local network 24, the user may need to initialize the account, or, subsequently, to update or recharge the account so that the user can originate calls in the coverage area of the local network 24. FIG. 4 illustrates one embodiment of a method 200 for unstructured supplementary services data (USSD) access to recharge a user's account. The method 200 begins with block 205, in which the controller 22 receives a USSD recharge request from the device 11. In block 210, the controller 22 determines if the USSD recharge request is local. If not, the method 200 moves to block 225 and the controller 22 determines if the request is a local balance check. If the request is not a local balance check, the method 200 moves to block 230 and the USSD request is processed per normal GSM procedures. In block

225, if the request is a local balance check, the method 200 moves to block 235 and the controller 22 attempts to retrieve the user's balance information from the HLR 24. The user is either found or not found in the HLR 24 (block 240). If the user is not found in the HLR 24, the method moves to block 245 and the controller 22 sends a response indicating the account cannot be identified. In block 240, if the user is found, the controller 22 sends a message with the balance, and the balance expiration, to the device 11 (block 250).

Returning to block 210, if the message from the device 11 is a local recharge USSD message, the method 200 moves to block 215, and the controller 22 searches the VLR 23 to try to locate the user's profile. In block 220, the controller 22 determines if the user is in the VLR 23. If the user is not in the VLR 23, the method 200 moves to block 255 and the controller 22 searches the for a route to the HLR of the user's home network 10. In block 260, the controller 22 determines if a route is found. If a route is not found, the method 200 moves to block 265 and the controller 22 determines if the user is in the local HLR 24. If the user is not in the local HLR 24, the method moves to block 270 and the controller 22 determines if a MSISDN is available. In block 270, if a MSISDN is not available, the USSD request is rejected (block 272). If in block 270, a MSISDN is available, the method moves to block 275 and the user is allocated a MSISDN profile for local service, and an expiration timer is set. The controller 22 then sends a SMS message to the user providing the new MSISDN assigned to the user's account.

Returning to block 265, if the user is in the local HLR 24, the method 200 moves to block 289. Returning to block 260, if a route to the home network HLR is found, the method 200 moves to block 280 and the controller 22 starts the location update process. In block 285, the location update is either accepted or rejected. If rejected, the method 200 moves to block 265. If accepted, the method moves to block 286, and the user is added to the VLR 23. The method 200 then moves to block 287.

Returning to block 220, if the user is in the VLR 23, the method 200 moves to block 288 and the controller 22 determines if the user is in the local HLR 24. If the user is not in the local HLR 24, the method 200 moves to block 287, normal roaming procedures are invoked, an invalid USSD request message is sent to the device 11, and the method 200 ends.

Returning to block 288, if the subscriber is in the local HLR 24, the controller 22 determines if the user's voucher 25 is valid. If the voucher is not valid, the method 200 moves to block 295 and the user's balance is not updated and the controller sends a USSD message to the device 11 indicating a failed attempt. If, in block 289, the voucher is determined to be valid, the method 200 moves to block 290 and the user's balance is updated, the expiration period for the account is set, and a response message is sent to the device 11 indicating the new balance and the expiration.

Figure 5:
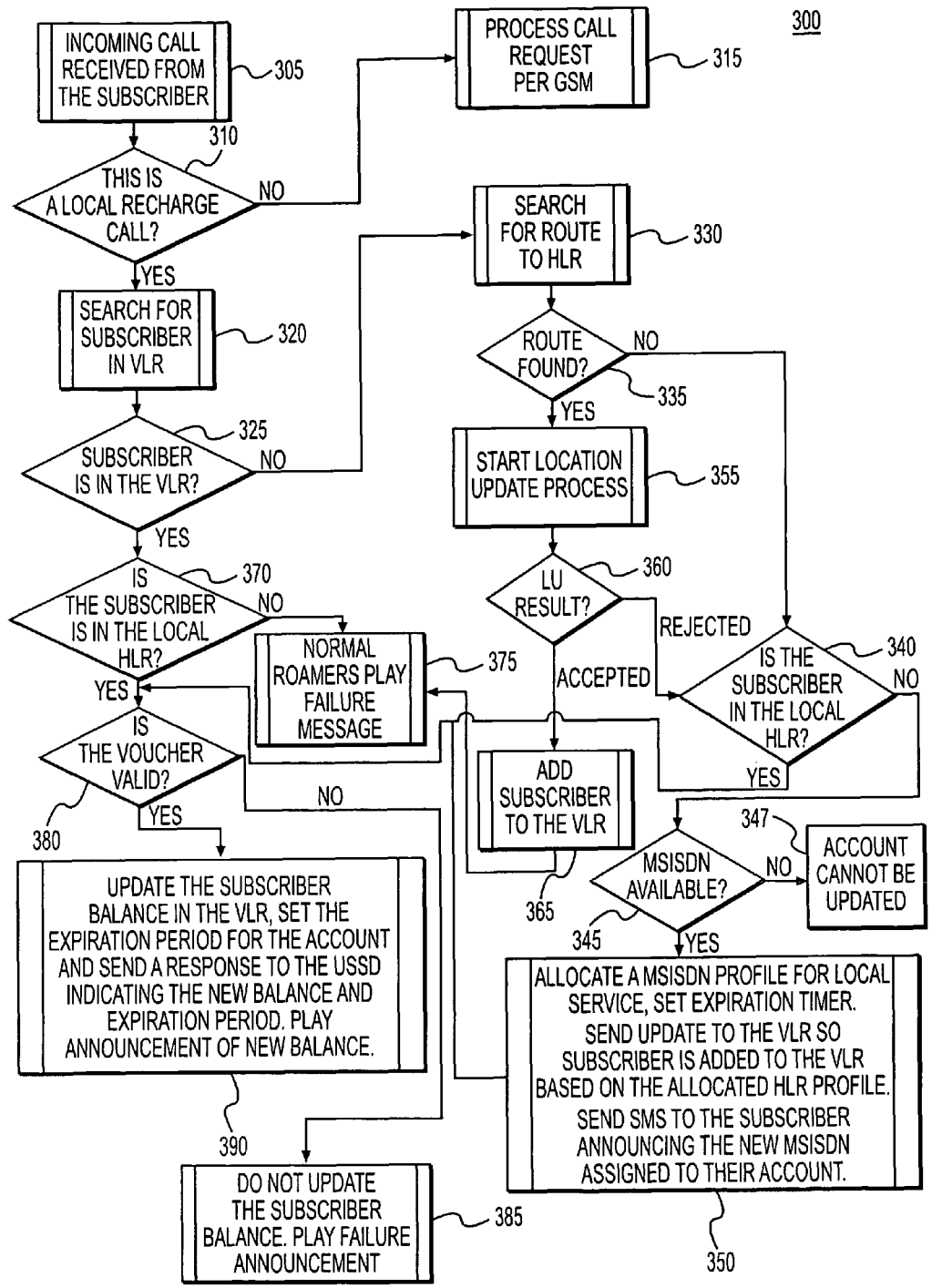
FIG. 5 illustrates an embodiment of a method for updating a users account balance.

A user also can update his account in the OTA Prepaid system by placing a call. FIG. 5 illustrates an embodiment of a method 300 whereby a user places a call to the local network 20 to update the user's prepaid account. The method begins in block 305, and the controller 22 receives a call from a user. In block 310, the controller 22 determines if the call is a local recharge call. If the call is not a local recharge call, the call is processed like a normal request, using GSM guidelines (block 315). However, if in block 310, the call is a local recharge call, the method 300 moves to block 320 and the controller 22 searches the VLR 23 to locate the user profile. The controller 22 determines if the user is in the VLR 23 (block 325). If the user is not in the VLR 23, the method 300 moves to block 330 and the controller 22 searches for a route to the HLR of the user's home network 10. In block 335, the controller 22 determines if a route to the HLR of the home network 10 is available. If a route is not available, the method 300 moves to block 340 and the controller 22 determines if the user is in the local HLR 24. If the user is in the local HLR 24, the method 300 moves to block 380. If the user is not in the local HLR 24, the method 300 moves to block 345 and the controller 22 determines if a MSISDN is available. If a MSISDN is not available, the controller 22 sends the user a rejection indicating the account cannot be updated (block 347). If, however, a MSISDN is available, the method 300 moves to block 350 and the controller 22 assigns a MSISDN to the user to allow local service, and sets an expiration timer. The controller 22 then sends an update to the VLR 23 based on the updated HLR profile. Finally, the controller 22 sends a SMS message to the user providing the new MSISDN. The method 300 then moves to block 380.

Returning to block 335, if a route to the HLR of the home network 10 is available, the method 300 moves to block 355 and the controller 22 starts the process of updating the location of the mobile device 11. In block 360, the controller 22 accepts or rejects the location update. If the location update is rejected, the method 300 moves to block 340. If the location update is accepted, the method 300 moves to block 365 and the controller 22 adds the user to the VLR 23. The method 300 then moves to block 375.

Returning to block 325, if the user is in the VLR 23, the method 300 moves to block 370 and the controller 22 determines if the user is in the local HLR 24. If the user is not in the local HLR 24, the method 300 moves to block 375 and normal roaming procedures apply. In addition the controller 22 sends a SMS message to the mobile device 11 indicating a failed recharge.

In block 370, if the user is in the local HLR 24, the method moves to block 380 and the controller 22 determines if the user's voucher is valid. If the voucher is not valid, the method 300 moves to block 385. The user's account balance is not updated and the controller 22 sends the user a failed transaction message. In block 380, if the voucher is valid, the method 300 moves to block 390 and the user's account balance in the VLR 23 is updated. In addition, an expiration timer is set to limit the time the update applies and a message is sent in response to the USSD message indicating the new balance and the expiration period.

Figure 6:
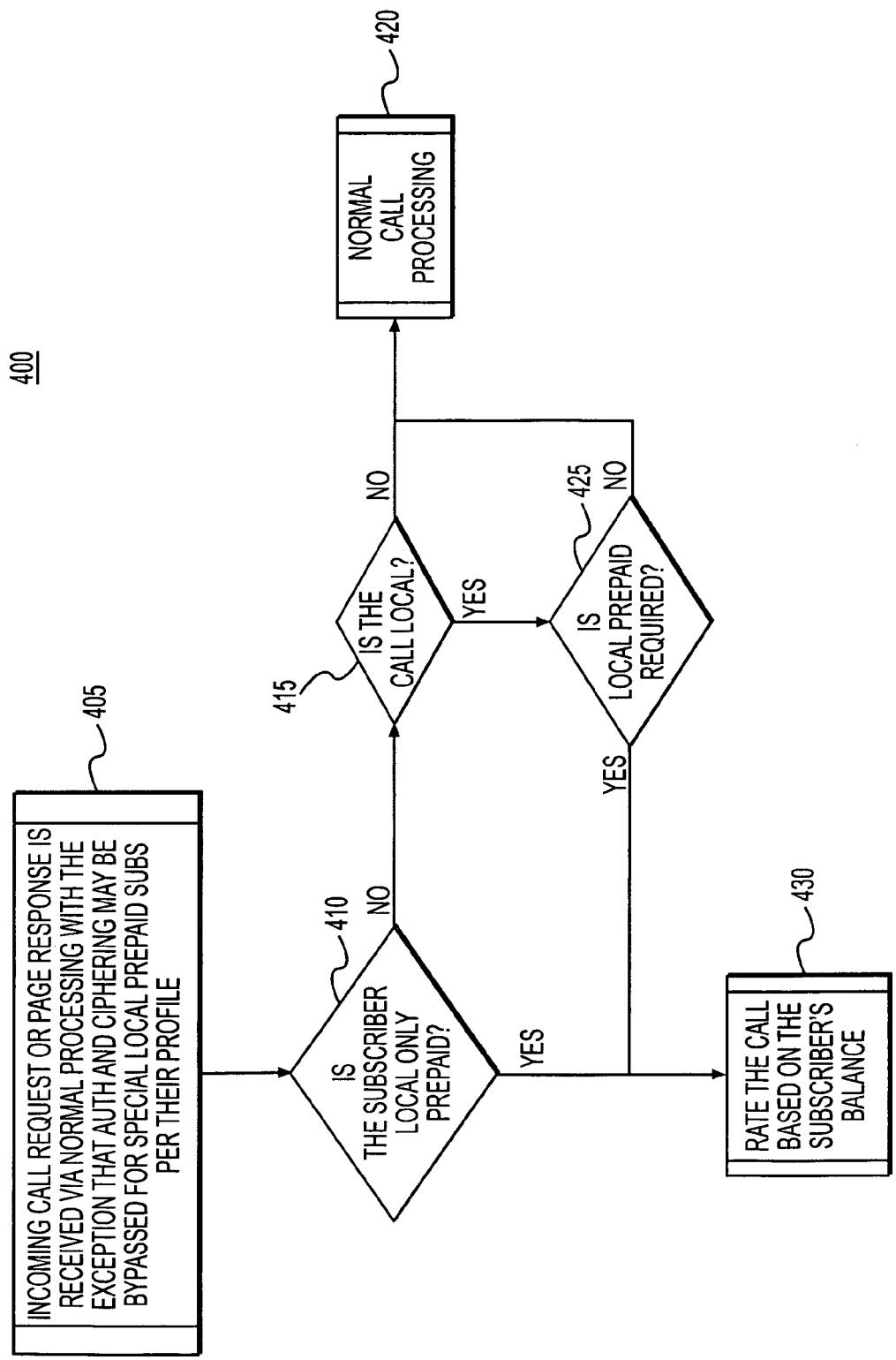
FIG. 6 is a flowchart illustrating a method for completing a mobile origination or termination.

FIG. 6 is a flowchart illustrating a process 400 for completing a mobile origination from or termination at the mobile device 11. The process 400 begins at block 405 with an incoming call request or page that is received by way of normal wireless call processing with the exception that authorization and ciphering may be bypassed for special local prepaid users according to their local profile. In block 410, the controller 22 determines if the user's profile specifies local only prepaid service. If the user's profile does not specify local only prepaid service, the process moves to block 415 and the controller 22 determines if the call is local. If the call is not local, the process 400 moves to block 420 and the controller 22 processes the call according to normal wireless call processing. In block 415, if the call is local, the process 400 moves to block 425 and the controller 22 determines if the call requires local prepaid. If local prepaid is not required, the process moves to block 420. If local prepaid is required, the process 400 moves to block 430. Returning to block 410, if the user's profile specifies local only prepaid service, the process 400 moves to block 430. In block 430, the controller 22 rates the call based on the user's account balance as stated in the HLR 24.

Figure 7:
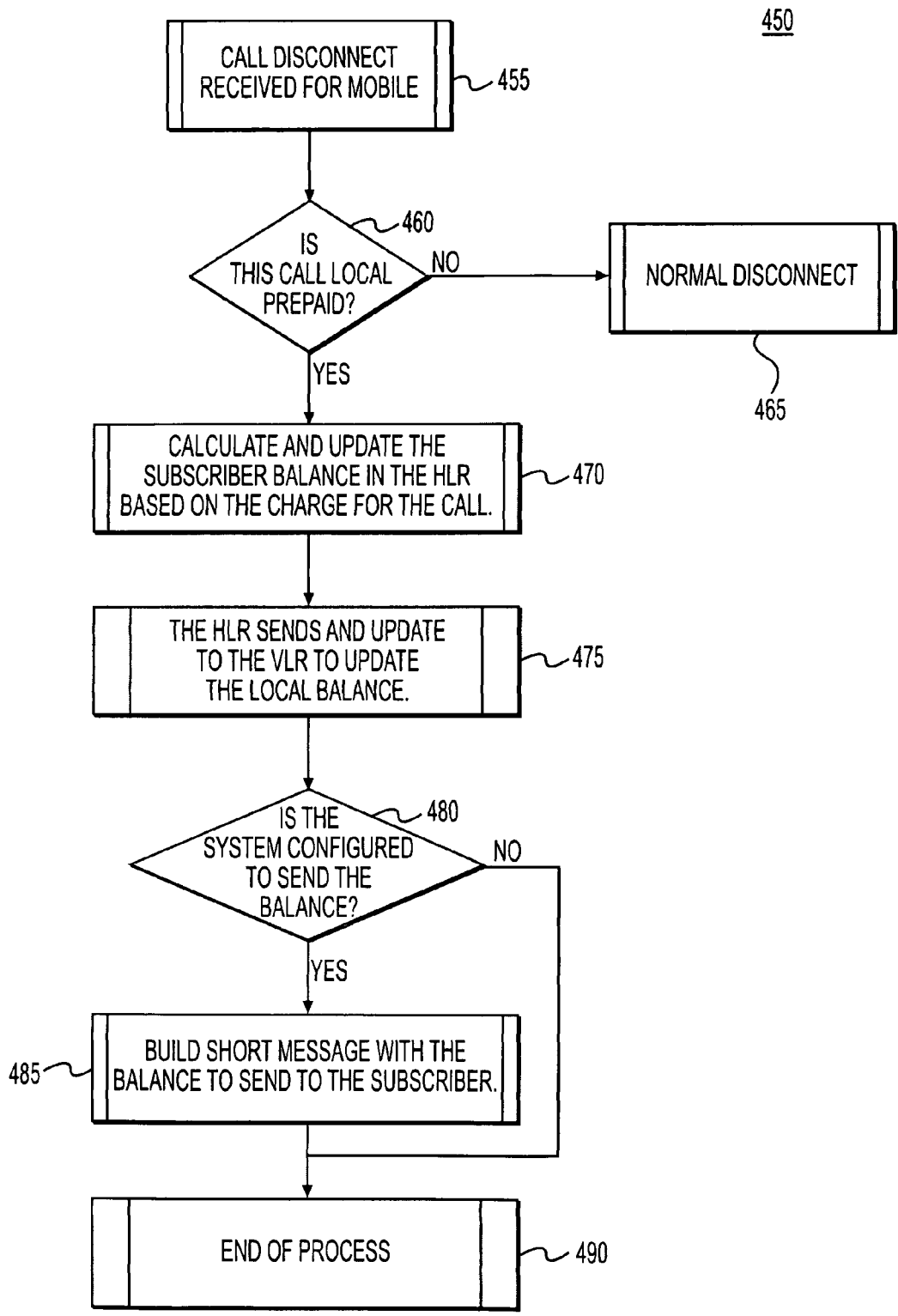
FIG. 7 is a flowchart illustrating a call disconnect method.

FIG. 7 is a flowchart illustrating a call disconnect process 450. In block 455, the controller 22 receives a call disconnect signal for the mobile device 11. In block 460, the controller 22 determines if the call being terminated is a local prepaid call. If not a local prepaid call, the process 450 moves to block 465 and normal call disconnect procedures are used. If the call is a local prepaid call, the process 450 moves to block 470 and the controller 22 calculates the total charge for the call and updates the user's account balance in the HLR 24. Next, in block 475, the updated balance in the user's account is sent to the VLR 23 to update the user's local account balance. In block 480, the controller 22 determines if a message can be sent to the user to notify the user of the updated account balance. If the message can be sent, the process moves to block 450 and the user is sent a SMS message stating the account balance. If the message cannot be sent, the process 450 moves to block 490. In block 490, the call disconnect process 450 ends.

The above description of prepaid call processing referred to GSM-based mobile devices. However, the same processes can be extended to any mobile voice technology, including CDMA, UMTS, UMA, and SIP. Other future voice, data, and multimedia technologies also may use the same basic concepts as outlined above, although the protocol messaging and system and/or network identification procedures may vary. With any such technologies, the process begins with a mobile device accessing a system or network. The system responds by sending queries to determine first if there is a valid profile held locally by the system, and second if the home system of the mobile device has a valid profile. If a valid profile is not found, local resources in the local system allocate a temporary profile to the mobile device. The profile information is then sent to the local device, including an assigned identification (e.g., MSISDN) as well as other information pertinent to the service.

The same concepts can extend to other wireless communication modes including, for example, packet data network access such as GPRS, EDGE, CDMA, 1xRTT, EVDO, WiFi, WiMAX, and SIP. For data type accesses, a valid identifier may be substituted for the MSISDN. Such identifiers include SIP URE, IMSI_T, IMSI_M, IP address, URL, and other identifying nomenclature as applicable to the specific data technology.

Figure 8:
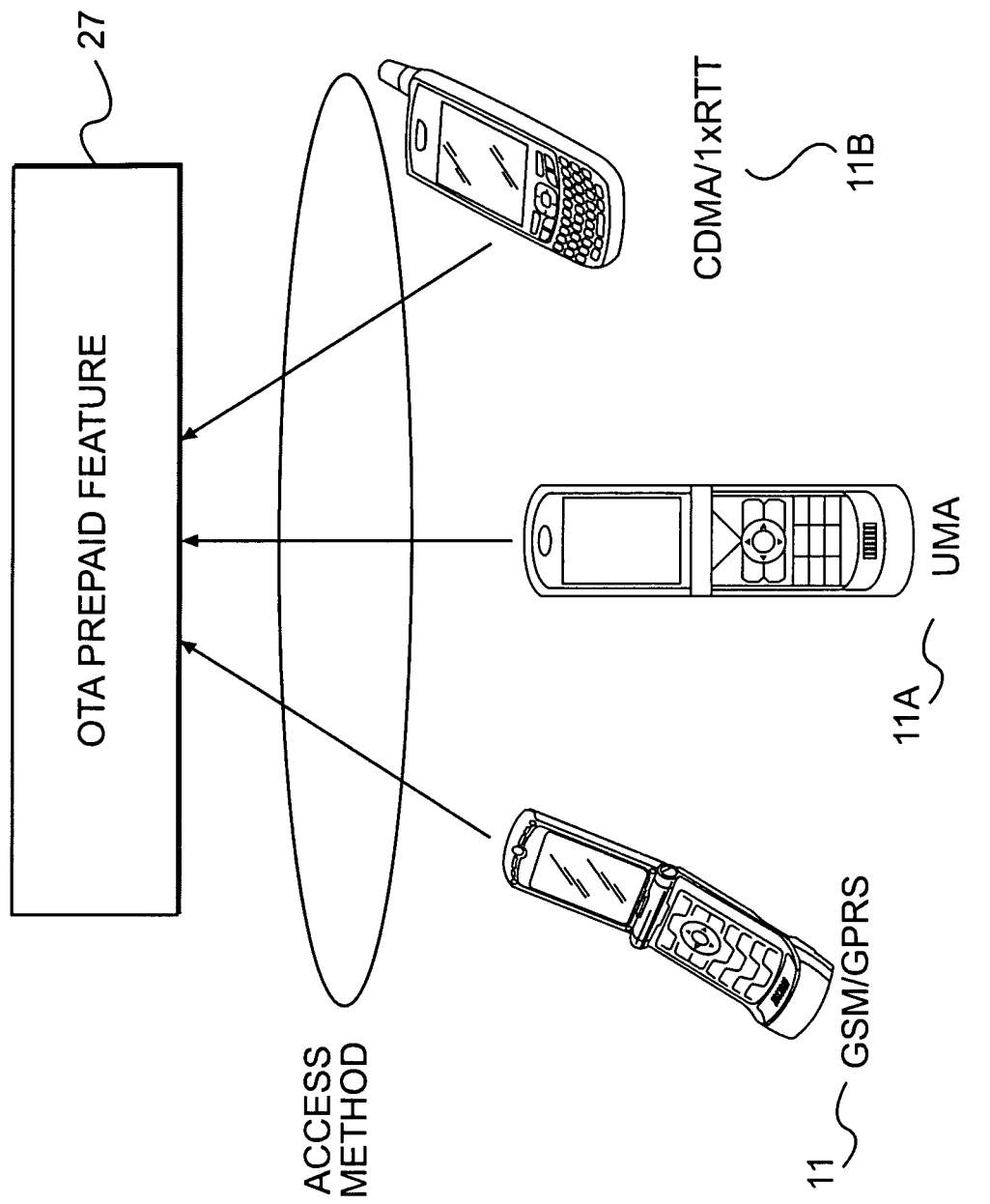
FIG. 8 illustrates application of the OTA Prepaid system to mobile devices having multiple technology capabilities.

The same processes described above also can be extended to mobile devices that support multiple technologies. Such multi-mode devices are commonplace today. For example, a user in a UMA environment can access the herein described OTA Prepaid system by way of a WiFi access point using the same identification (phone number) as when accessing the OTA Prepaid system using GSM technology. Similarly, when a GSM user whose mobile device also support GPRS accesses the system, the OTA Prepaid feature can operate across both technologies. Other common combinations of technologies include GSM and EDGE, CDMA and 1xRTT, and CDMA and EDVO. The combined control of the OTA Prepaid feature across these different technologies provides the user with a seamless service. FIG. 8 illustrates application of the OTA Prepaid feature to multiple technology devices. Three mobile devices, 11, 11A, and 11B access OTA Prepaid feature 27 using an access method that is common to the multiple technologies the device supports.

Figure 9:
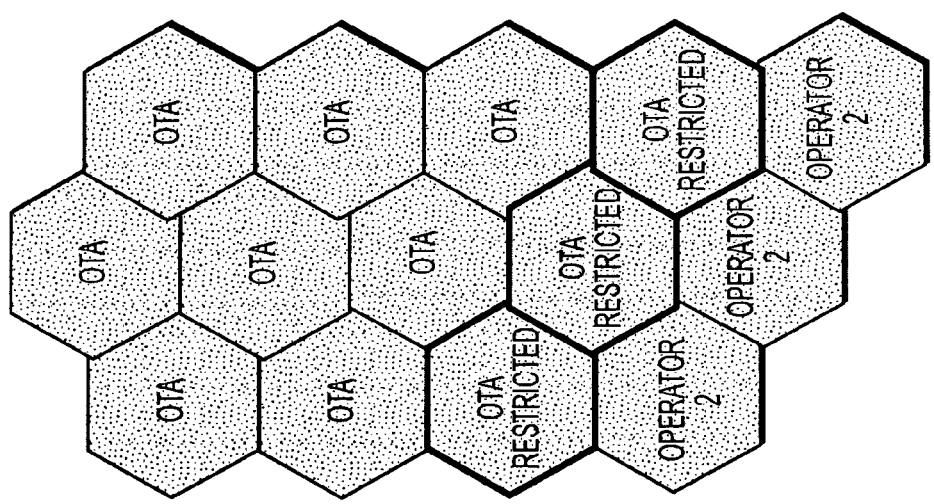
FIG. 9 illustrates a location-restricted OTA Prepaid system.

As another aspect of the OTA Prepaid system described above, a system operator can specify certain locations within the coverage area of the wireless network (e.g., the wireless network 20 of FIG. 1) where the OTA Prepaid feature does not apply. The determining factor can be a cell identifier, GPS location, or other method of location determination. The restrictions may be related to a particular roaming partner network or other operator or service provider agreement. When a user who has been allocated an OTA Prepaid account moves though the coverage area of the network, the allocation of service is determined based on the location of that user in the coverage area and the agreements in place with other networks. FIG. 9 illustrates such an arrangement. In FIG. 9, coverage area 501 includes a number of cells. Cells marked as OTA are enabled with the OTA Prepaid feature. Cell labeled with OTA Restricted have the OTA Prepaid feature disabled as the coverage area overlaps with a coverage area of neighboring operator 2.

Figure 10:
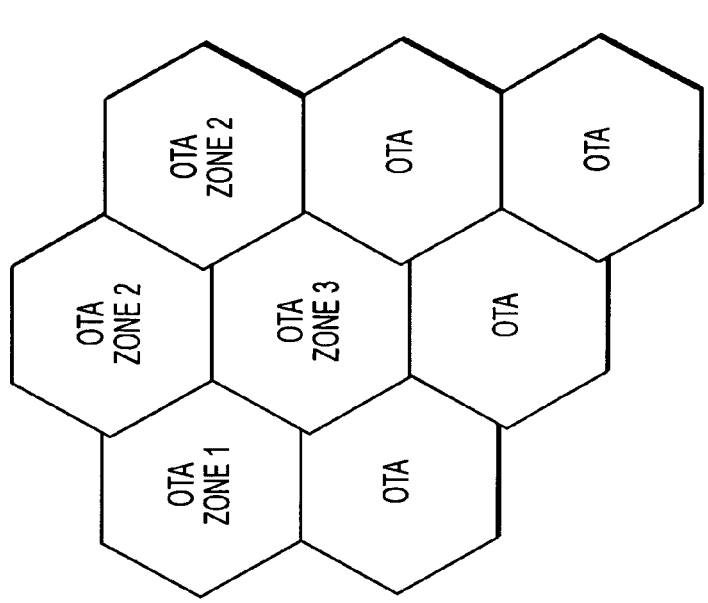
FIG. 10 illustrates operation of the OTA Prepaid system in a wireless local loop environment.

In a wireless network such as the network 20 of FIG. 1, a user is permitted access to the OTA Prepaid feature throughout the coverage area of the network when the OTA Prepaid system allocates an account to the user. The location restriction option described above with respect to FIG. 8 can be used to restrict a user or a group of users from particular areas of the network. Another option that may be implemented is a wireless local loop (WLL) option. With the WLL option, the area of operation the user is permitted for the OTA Prepaid feature is limited to a defined zone or zones within the coverage area of the local network. A zone may be as small as a single location determined by a location positioning technology. Alternately, the zone may exist as a collection of cells or other defined areas within the coverage area of the local network. The defined zone may be assigned on a per user basis (i.e., per OTA Prepaid account) or the zone may be assigned to groups of users per the network operator's requirements. Such an optional type of access to the OTA Prepaid feature may be advantageous in areas where the required service is localized to a smaller area (or single location) within the overall coverage area. FIG. 10 illustrates such an arrangement. In FIG. 10, coverage area 502 includes several cells, or zones. In the overall coverage area 502, three zones (Zone 1, Zone 2, and Zone 3) are designated as wireless local coops. Users allocated to the OTA Prepaid feature are provided access based on the zones identified in their user's profiles. With the ability to automatically allocate an account within a particular area, a wireless loop system can be deployed with the OTA Prepaid feature, independent of the user's mobile device technology. Users are automatically allocated numbers (MSISDNs) for a period of time when they access the OTA Prepaid system. When a GPS type location is included, this feature can provide a land-line like number allocation to a specific zone. In addition, with this aspect of the OTA Prepaid system, an operator can provide automated service to a zone or zones without the need to provision the user's mobile device.

In the above described processes, when a user qualifies for access to the OTA Prepaid system, information is transferred to the user's mobile device, such as the device 11. The initial iteration of such information transfer is by way of SMS and USSD messages. However, other information transfer methods may be used, including voice messaging, video messaging, email, instant messaging, and facsimile, for example.

The above described OTA Prepaid system uses a basic "first available" number to assign MSISDNs to users' accounts. The use of a MSISDN provides a guaranteed range of numbers that can route to the target system. However, alternate methods of allocating MSISDNs (or other numbers) also may be used with the OTA Prepaid system.

Figure 11:
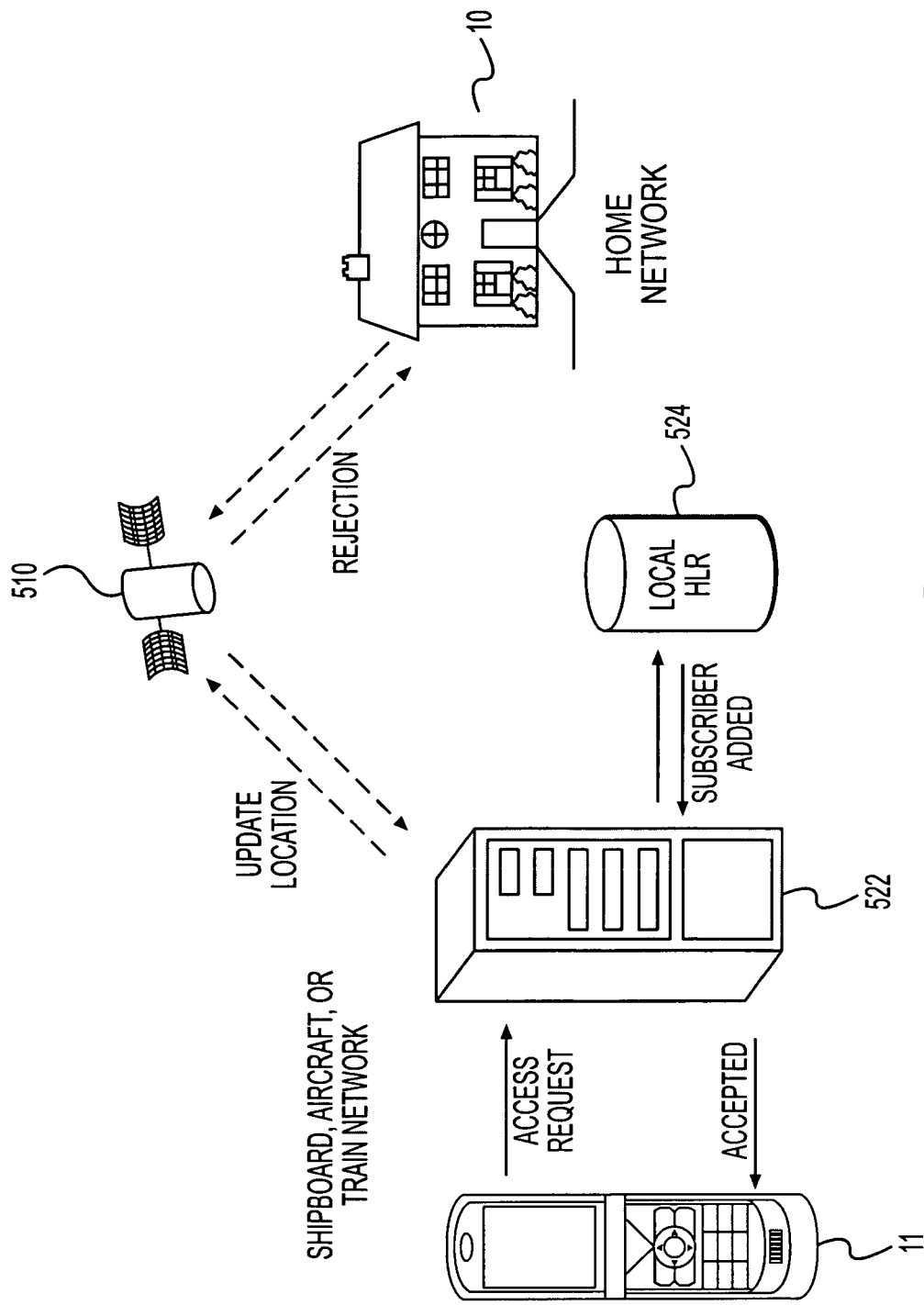
FIG. 11 illustrates allocation of a user account number for the OTA Prepaid system in an mobile network environment, such as on a ship, aircraft, or train.

The allocation of MSISDN (phone number or identifier) can be based on the location of the OTA Prepaid system where the user initially accesses the network. This method of number access has applicability in the wireless local environment, but also can be used in other environments. FIG. 11 illustrates such an application. In FIG. 11, a mobile network, such as might exist onboard a ship, aircraft or train, is accessed by a user's mobile device 11. The mobile wireless network includes a controller 522 and HLR 524. The controller 522 communicates with the user's home network 10 by way of satellite 510. In networks where remote areas are being serviced and the population has a transient history, the use of temporary numbers for a limited time period can be applied to limit the interaction time (e.g., for the duration of the trip) of the user.

Figure 12:
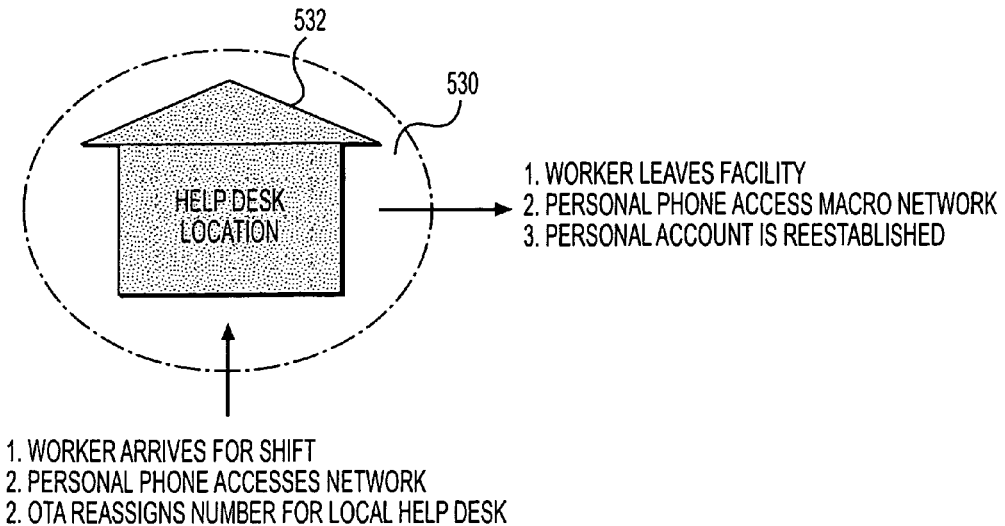
FIG. 12 illustrates service restriction based on location cross referenced to a user.

Allocation of temporary numbers also may be based on a location cross referenced with a preprogrammed list of users. When one such user arrives at a particular location and meets certain criteria, the user's mobile device is reassigned by the OTA Prepaid system to a temporary account while the user remains within the coverage area of that location. FIG. 12 illustrates one such example of location cross referenced to a user. In FIG. 12, a help desk 532 is located within coverage area 530. A user is employed by and works the help desk 532. The user arrives at the help desk 532 at the start of the user's shift. The user's personal mobile device accesses the network supporting the coverage area 530. The OTA Prepaid system within the network reassigns the user's personal mobile device to assume the identity of the help desk number based on the time of day (i.e., shift period) and the location of the mobile device at the help desk 532. When the user leaves the help desk 532, the user's mobile device reverts to the user's personal account. A similar arrangement could exist with any employee situation or work environment.

The above described OTA Prepaid system may be implemented as a stand alone application server that is independent of the wireless system that normally provides the user identification allocation. Alternately, the features of the OTA Prepaid system may be incorporated into the normal architecture of the serving wireless system.

Figure 13:
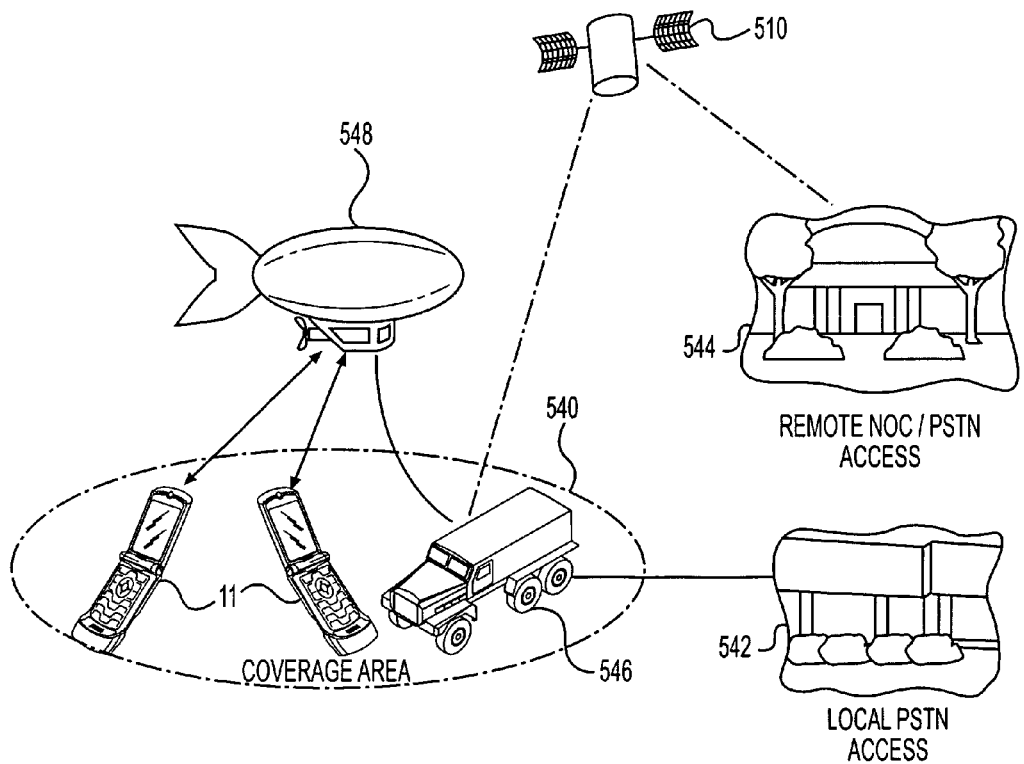
FIG. 13 illustrates operation of the OTA Prepaid system in an emergency response situation.

The OTA Prepaid feature may be used in certain emergency response situations. In these situations, the OTA Prepaid feature allows emergency response personnel, as well as other personnel, to have access to a wireless service assuming the user's mobile device operates at the correct broadcast frequency and is of a compatible technology. FIG. 13 illustrates an example of such an emergency situation. In FIG. 13, an emergency situation exists, and in response, a mobile vehicle 546 has been dispatched. The mobile vehicle 546 floats balloon 548, and establishes local coverage area 540. The mobile vehicle 546 has local PSTN access 542 and remote PSTN access 544 by way of satellite 510. User devices 11 within the coverage area 540 can access the wireless network serving the coverage area 540, with the OTA Prepaid feature assigning temporary numbers (identifiers) to the devices 11.

As discussed with respect to the HLR 24, a user accessing the OTA Prepaid feature will be checked to verify a valid voucher. However, other forms of payment are possible with the OTA Prepaid system. For example, instead of preprinted vouchers, credit and debit cards may be used. Use of credit and debit cards may be implemented over the air by accessing the OTA Prepaid system, or by a user defined Web interface or a point of sale processing the transaction. Additionally, the credit and debit card access can be established so that automated charging occurs when the established prepaid account triggers a recharge event. This trigger may be based on time, balance, or other defined event.

The invention claimed is:

1. A method, implemented on a suitably programmed device, for providing over the air (OTA) prepaid calling services, the method comprising:
receiving at a wireless system, an access request from a wireless device;
determining the wireless system is not a home system of the wireless device;
determining at the wireless system alone that the wireless device does not have a valid profile;
allocating a mobile subscriber integrated services digital network (MSISDN) profile for local service in the wireless system to create a temporary profile associated with the wireless device;
setting an expiration timer for expiration of the temporary profile;
sending an update to a visitor location register (VLR) of the wireless system to add the wireless device to the VLR, based on the temporary profile; and
sending information on the temporary profile a short message service (SMS) message to the wireless device announcing the allocated MSISDN.

2. The method of claim 1, further comprising establishing a balance to fund a prepaid account.

3. The method of claim 2, wherein sending the information on the temporary profile to the wireless device comprises sending the prepaid account balance and the expiration of the temporary profile.

4. The method of claim 2, wherein establishing the prepaid account balance comprises receiving a voucher from a user of the wireless device.

5. The method of claim 2, wherein establishing the prepaid account balance comprises receiving a credit/debit card authorization from a user of the wireless device.

6. The method of claim 2, further comprising receiving an update request to update the prepaid account balance.

7. A method, implemented on a suitably programmed device, for providing over the air (OTA) prepaid calling services, the method comprising:
receiving at a local wireless network, a location update request from a wireless device;
determining at the local wireless network alone that a route does not exist to a HLR of a home network for the wireless device;
determining that the wireless device does not have a valid profile in a HLR of the local wireless network;
allocating a MSISDN profile for local service in the local wireless system to create a temporary profile associated with the wireless device;
setting an expiration timer for expiration of the temporary profile;
sending an update to a visitor location register (VLR) of the wireless system to add the wireless device to the VLR, based on the temporary profile; and
sending information on the temporary profile a SMS message to the wireless device announcing the allocated MSISDN.

8. The method of claim 7, further comprising establishing a balance to fund a prepaid account.

9. The method of claim 8, wherein sending the information on the temporary profile to the wireless device comprises sending the prepaid account balance and the expiration of the temporary profile.

10. The method of claim 8, wherein establishing the prepaid account balance comprises receiving a voucher from a user of the wireless device.

11. The method of claim 8, wherein establishing the prepaid account balance comprises receiving a credit/debit card authorization from a user of the wireless device.

12. The method of claim 8, further comprising receiving an update request to update the prepaid account balance.

13. The method of claim 7, further comprising specifying locations within a coverage area of the local wireless network where the OTA prepaid system does not provide calling services.

14. The method of claim 7 further comprising establishing local loops within a coverage area of the local wireless network in which OTA prepaid services are provided.

15. The method of claim 7, further comprising cross referencing a user of the local wireless network and specific locations within the local wireless network such that the OTA service is provided when the cross referenced user is at one of the specified locations, the method further comprising assigning a temporary MSISDN to the wireless device when the OTA prepaid service is enabled, the temporary MSISDN allocated to a specific location.

16. The method of claim 7 wherein the local wireless network is established on a mobile platform including one of a ship, an aircraft, and a train.

17. A method, implemented on a computing device, for providing over the air (OTA) prepaid communication services, the method, comprising:
- receiving, at a local network, a communication from a mobile device entering the local network;
- determining at the local network alone that a valid profile corresponding to the mobile device does not exist in the local network;
- allocating resources a MSISDN profile for local service at the local network to create a temporary profile for the mobile device;
- setting an expiration timer for expiration of the temporary profile;
- sending an update to a visitor location register (VLR) of the wireless system to add the wireless device to the VLR, based on the temporary profile; and
- sending a SMS message to the wireless device announcing the allocated MSISDN.

* * * * *